Figure 1:
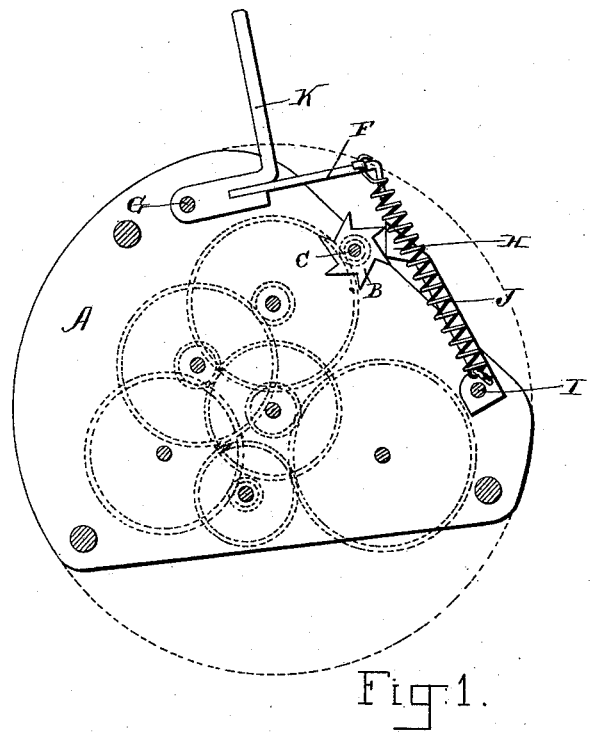

(Model.)

M. H. DOWNES.
MECHANICAL MOVEMENT FOR CYCLOMETERS.

No. 363,735. Patented May 24, 1887.

WITNESSES

INVENTOR

UNITED STATES PATENT OFFICE.

MOSES H. DOWNES, OF MALDEN, ASSIGNOR TO THE OVERMAN WHEEL COMPANY, OF CHICOPEE, AND CHARLES E. W. WOODWARD, OF CAMBRIDGE, MASSACHUSETTS.

MECHANICAL MOVEMENT FOR CYCLOMETERS.

SPECIFICATION forming part of Letters Patent No. 363,735, dated May 24, 1887.

Application filed November 19, 1886. Serial No. 219,385. (Model.)

*To all whom it may concern:*

Be it known that I, MOSES H. DOWNES, of Malden, in the county of Middlesex and State of Massachusetts, have invented certain new and useful Improvements in Mechanical Movements, of which the following, taken in connection with the accompanying drawings, is a specification.

This invention is a new mechanical movement applicable to a variety of purposes, and it is embodied in apparatus serving to convert a vibrating or reciprocating motion into a rotary one.

My special object in the present improvement is to provide a strictly accurate and reliable means for actuating a train of gearing and registering apparatus in cyclometers and other distance-measuring mechanism. I have therefore in the drawings illustrated my invention in a form suitable to be applied to a cyclometer; but I do not design to limit it to said instrument.

My invention consists in the combination of two separately-pivoted pawls with a spring or link which connects them flexibly, and with a toothed wheel, with which both pawls engage to positively actuate it alternately. Power is applied to a projecting arm of the superior pawl, which actuates the ratchet-wheel and the gearing connected therewith, the secondary pawl, of weaker force, completing the stroke and preventing any retrograde movement during the vibration of the arm.

The appended claims set forth specifically the features peculiar to my invention.

Figure 2:
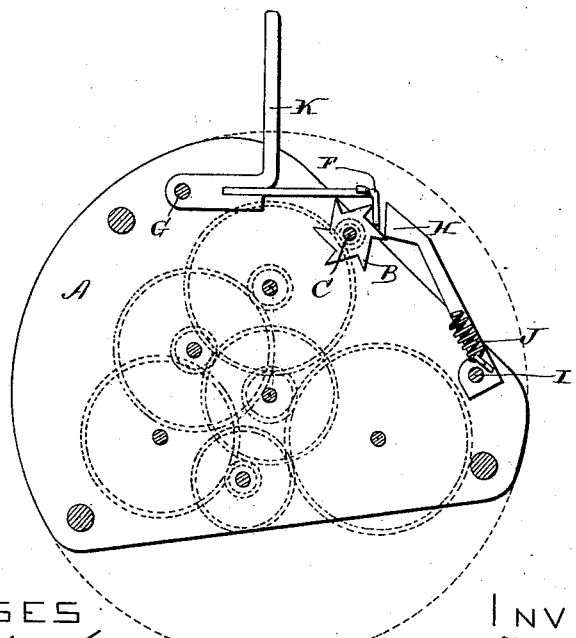

The drawings represent the simple nature of my invention, Figures 1 and 2 showing the relation of the two connected pawls to the ratchet-wheel.

A is a disk representing one of two plates, between which the working parts of my apparatus may be mounted. B is a ratchet-wheel rotating upon the shaft C, which also carries the primary pinion of the train of gearing.

F represents the primary pawl, pivoted at G, and (at its toe) bearing against a tooth of the ratchet-wheel B, to move the same about its axis C. H denotes a secondary pawl pivoted at I, and engaging at its free end with the teeth of the wheel B, to positively move said wheel forward and prevent retrograde movement. These two pawls are shown connected by a spring, J, which acts upon them both, and the connection is such that a much stronger force is exerted by said spring upon the pawl F than upon the pawl H. This difference, under the arrangement shown, is due to the attachment of the spring to pawl F near its toe and to pawl H near its pivot; or, in other words, in the one case acting on a long lever and in the other on a short one. Variations in the intensity of the strain may also be effected by changing the direction from which it is applied to the two pawls. Instead of attaching the link or spring J to the pawls direct, it may be connected with arms on the axes of the pawls.

The primary or superior pawl F has affixed to it a projecting arm, K, to which power is applied by an external force adequate to vibrate it or to move the arm and pawl in one or both directions. When the spring J is employed, with an excess of leverage to actuate the pawl in one direction, as shown, the external force may simply give the stroke in opposition to the spring. The tension of the spring causes the pawl F to press upon a tooth of the ratchet-wheel and move said wheel on its axis nearly to the peripheral extent of one tooth, this movement of the wheel meanwhile lifting the toe of pawl H into position to act. Now, when the pawl F is raised by the external force swinging the arm K back on its pivot G, the pawl H bears on a tooth of the ratchet-wheel to complete the movement to the extent of one tooth begun by pawl F, and to hold said wheel by a limited pressure until the next vibration of arm K causes pawl F to again move the wheel. The diagrams, Figs. 1 and 2, illustrate this movement. When the arm has been moved by the external power in opposition to the spring, the parts are as seen in Fig. 1, the inferior pawl resting with its toe between two teeth, while the pawl F is ready to descend under the spring-tension and bear upon the exposed tooth of wheel B. This contact is a sliding one, beginning near the point of the tooth and gradually approaching the root of the next one as the wheel rotates, the movement ending when the point of the next tooth strikes the under side of the toe of the pawl and the parts are as in Fig. 2.

The power externally applied may give the complete vibratory movement to the projecting arm and the pawl F. In such case I may connect the two pawls flexibly by means of a link pivoted to each pawl at a proper point to give the desired movement. This substitution retains the flexible connection between the two pawls which is peculiar to my invention.

My improvement is applicable to a variety of uses in transmitting power or changing its direction, and especially to counting or registering instruments. The projecting arm may be connected with the armature of an electrical apparatus, and thereby a train of gearing be actuated. The fact that it is the yielding spring-power which in my device acts upon the pawls to actuate the train is a material advantage.

I claim as my invention—

1. A rotating toothed wheel and two separately-pivoted rigid pawls, both positively actuating said wheel and connected directly with each other by a spring stretched between them and so applied as to act on one with materially greater force than on the other, for the purpose set forth.

2. A rotating toothed wheel and two pawls, each mounted on a fixed and independent pivot and each acting positively on said wheel, as described, to rotate it, the propelling force being applied to each pawl through a spring, substantially as set forth.

3. The primary pawl F, actuated by an external superior force and reacting upon the ratchet-wheel B to move it on its axis nearly one tooth, in combination with the secondary pawl H, actuated by a spring connecting it to the pawl F and serving to complete the forward movement of the wheel B begun by the primary pawl, and to hold it locked against retrograde movement, substantially as set forth.

4. In a mechanical movement, two pawls, a flexible connection between them, and gearing driven by each of said pawls alternately, driving-power being applied through the connection from one of them to the other, substantially as set forth.

5. The combination of two pawls, with a spring-connection between them and gearing positively driven by each of them, driving-power being applied to one of said pawls through an external arm and to each pawl alternately through said spring, substantially as set forth.

In testimony whereof I have signed my name to this specification, in the presence of two subscribing witnesses, on this 12th day of November, A. D. 1886.

MOSES H. DOWNES.

Witnesses:
A. H. SPENCER,
C. E. W. WOODWARD.